United States Patent
Feiel et al.

(10) Patent No.: US 11,946,375 B2
(45) Date of Patent: Apr. 2, 2024

(54) ROCK ANCHOR WITH SENSOR FOR MEASURING A MECHANICAL TENSION

(71) Applicant: MONTANUNIVERSITÄT LEOBEN, Leoben (AT)

(72) Inventors: Susanne Feiel, Leoben (AT); Wolfgang Kern, Leoben (AT); Thomas Griesser, Leoben (AT); Peter Moser, Leoben (AT)

(73) Assignee: MONTANUNIVERSITÄT LEOBEN, Leoben (AT)

( * ) Notice: Subject to any disclaimer, the term of this patent is extended or adjusted under 35 U.S.C. 154(b) by 429 days.

(21) Appl. No.: 17/431,695

(22) PCT Filed: Feb. 6, 2020

(86) PCT No.: PCT/EP2020/053028
§ 371 (c)(1),
(2) Date: Aug. 17, 2021

(87) PCT Pub. No.: WO2020/169356
PCT Pub. Date: Aug. 27, 2020

(65) Prior Publication Data
US 2022/0136389 A1    May 5, 2022

(30) Foreign Application Priority Data
Feb. 19, 2019  (AT) .............. A 60039/2019

(51) Int. Cl.
*E21D 21/02*     (2006.01)
*F16B 31/02*     (2006.01)
(52) U.S. Cl.
CPC .............. *E21D 21/02* (2013.01); *F16B 31/02* (2013.01)

(58) Field of Classification Search
CPC ................................ E21D 21/02; F16B 31/02
See application file for complete search history.

(56) References Cited

U.S. PATENT DOCUMENTS

| | | | | |
|---|---|---|---|---|
| 5,929,341 A | * | 7/1999 | Bawden | ............ G01B 5/30 73/152.59 |
| 6,311,564 B1 | * | 11/2001 | Martin | ............ G01B 7/18 73/787 |

(Continued)

FOREIGN PATENT DOCUMENTS

| | | |
|---|---|---|
| CN | 2319568 Y | 5/1999 |
| CN | 201010905 Y | 1/2008 |

(Continued)

OTHER PUBLICATIONS

International Search Report of PCT/EP2020/053028, dated May 20, 2020, 7 pages.

(Continued)

*Primary Examiner* — Francis C Gray
(74) *Attorney, Agent, or Firm* — Lewis Roca Rothgerber Christie LLP

(57) ABSTRACT

Embodiments of the present invention relate to a rock anchor with condition monitoring for determining tensions or deformations in form of a conductor trace which is applied on an anchor body, whose electrical resistance changes proportionally with respect to the tension/deformation. The conductor trace may consist of an electrically conductive ink which is directly applied on the anchor body by a printing method.

20 Claims, 3 Drawing Sheets

(56) References Cited

U.S. PATENT DOCUMENTS

Figure 1:
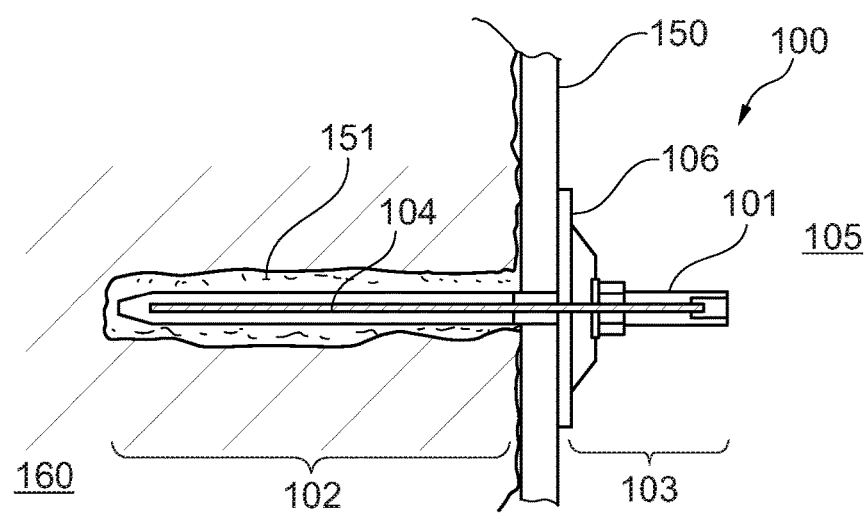

| | | | | |
|---|---|---|---|---|
| 2005/0011265 | A1* | 1/2005 | Brink | E21D 20/02 |
| | | | | 73/588 |
| 2005/0231377 | A1* | 10/2005 | Sunderman | E21D 21/004 |
| | | | | 340/665 |
| 2012/0048009 | A1* | 3/2012 | Berg | E21D 20/028 |
| | | | | 405/259.5 |
| 2012/0227507 | A1* | 9/2012 | Mitri | E21D 21/02 |
| | | | | 73/761 |
| 2014/0123766 | A1 | 5/2014 | Bach | |
| 2018/0067003 | A1 | 3/2018 | Michiwaki | |

FOREIGN PATENT DOCUMENTS

| | | | | |
|---|---|---|---|---|
| CN | 102720515 | A | 10/2012 | |
| CN | 203097917 | U | 7/2013 | |
| CN | 103485811 | B | 12/2015 | |
| CN | 109578039 | A * | 4/2019 | |
| CN | 114961819 | A * | 8/2022 | |
| DE | 10 2007 020 131 | A1 | 10/2008 | |
| DE | 10 2014 101 241 | A1 | 8/2015 | |
| DE | 10 2017 009 443 | A1 | 10/2018 | |
| EP | 1 906 161 | A1 | 4/2008 | |
| NL | 1006273 | C2 | 12/1998 | |
| WO | WO 2017/219134 | A1 | 12/2017 | |
| WO | WO-2020245081 | A1 * | 12/2020 | E21D 21/02 |

OTHER PUBLICATIONS

International Written Opinion of PCT/EP2020/053028, dated May 20, 2020, 7 pages.

Song et al., "A Review of Rock Bolt Monitoring Using Smart Sensors," Sensors 2017, 17, 776, 26 pages, pp. 1-24.

* cited by examiner

ROCK ANCHOR WITH SENSOR FOR MEASURING A MECHANICAL TENSION

CROSS-REFERENCE TO RELATED APPLICATIONS

This application is a national US phase of PCT/EP2020/053028 filed 6 Feb. 2020, which claims priority to Austrian patent application A60039/2019, filed on 19 Feb. 2019, the entire content of each of which is hereby incorporated by reference.

TECHNICAL FIELD

Embodiments of the present invention relate to devices for attaching and strengthening of bodies (support elements), in particular a rock anchor (German: Gebirgsanker), a supporting anchor, a reinforcement rod, a screw and a bolt, respectively, or a dowel, and a method for attaching an object to a support element and a method for stabilizing or reinforcing a support element, wherein the device comprises a condition monitoring for determining a deformation. Furthermore, embodiments of the present invention relate to a method for manufacturing a device.

TECHNOLOGICAL BACKGROUND

Anchors and in particular rock anchors are used in mines and in construction engineering under ground and above ground in a large number for securing the rock (solid rock or loose rock) and also buildings (support walls, dams for dump material, tailings ponds, etc.). Anchors are inserted in bore holes and are anchored in them. Anchoring may be performed by mortaring or gluing over the anchor length, by friction along the bore hole wall or by mechanically anchoring in the bore hole. Alternatively, an anchor may also be hammered in loose material or in semi-solid material. By the anchoring itself or by anchoring the anchor in the rock (solid rock or loose rock) or building, the rock or building is internally stabilized. For example, supporting anchors attach support walls to the rock to be supported.

Anchors have a rod-shaped shape and a length which is adapted to the object (rock, building) to be secured. Anchors may comprise lengths of less than 1 meter up to 100 m and more. Suitable anchors may consist of a highly solid material, typically steel, but also plastics, composite materials, or renewable raw materials, such as wood and bamboo. When the rock or another material which surrounds the anchor is moving, it exerts forces on the anchor, which induce mechanical tensions in the anchor. The anchor starts to deform. In a manner comparable to anchors, reinforcement steel is incorporated in concrete during concreting works, to impart higher strengths and in particular higher tensile strengths to it. Such solidified concrete is denoted as reinforced concrete. When forces are acting on the reinforced concrete structure, they are also transferred to the incorporated reinforcement which starts to deform.

Furthermore, when attaching objects to corresponding support elements (rock or buildings) by devices such as screws, bolts or dowels, mechanical tensions are generated, when the devices are inserted into the support elements, for example by screws or by pressing. Also these mechanical tensions lead to a deformation of the device.

SUMMARY OF THE INVENTION

There may be a need to monitor a stability of an attachment between an object and a support element and a hardening (German: Verfestigung) itself, respectively, by a device.

According to a first aspect of the present invention, a device (for example an anchor, rock anchor, supporting anchor, reinforcement rod, screw, or dowel) for attaching an object to a support element (for example a building and a building wall or a rock wall, respectively) and/or for stabilizing and reinforcing, respectively, the support element is described, wherein the device comprises a condition monitoring for determining a mechanical tension (which causes in particular a deformation of the device). The device comprises an attachment body with an attachment portion for inserting in the support element and for attaching the object to the support element, respectively, and a conductor trace which is electrically conductive and is applied along a trace-shaped extension for measuring a mechanical tension at the attachment portion. The attachment body comprises a coupling portion for coupling with an evaluation unit. The conductor trace is configured such that it is coupleable from the coupling portion with electric energy from the evaluation unit, wherein the electrical resistance of the conductor trace is indicative for the deformation of the attachment body in the attachment portion.

According to a further aspect, a method for determining a mechanical tension and a deformation, respectively, of an above described device for attaching an object to a support element or for stabilizing the support element is described. According to the method, an electrical resistance of the conductor trace is measured, wherein the electrical resistance is indicative for the mechanical tension and the deformation, respectively, of the attachment body in the attachment portion.

According to a further aspect, a method for manufacturing a device for attaching an object to a support element and/or for stabilizing the support element is described. According to the method, an attachment body with an attachment portion for inserting in the support element is provided. An electrically conductive conductor trace is applied on the attachment portion along a trace-shaped extension for measuring a mechanical tension. The attachment body comprises a coupling portion for coupling with an evaluation unit. The conductor trace is configured such that it is suppliable with electric energy from the coupling portion, wherein the electrical resistance of the conductor trace is indicative for the deformation of the attachment body in the attachment portion.

Usually, in devices which reinforce, for example as supporting anchor, a rock wall or which, as rock anchor or screw-/bolt connection attach an object to a support element, a decrease of the mechanical tension between the attachment components and thus a loosening of the attachment and the stabilization, respectively, occurs over time. Furthermore, in particular in case of a motion of the support element, for example the rock wall or a support wall of a building, the mechanical tension between the support element and the attachment body of the attachment means may increase or decrease. Both leads to a deformation of the attachment body or to a breakage which is indicative for the quality and the stability of the attachment.

The device according to embodiments of the present invention comprises a condition monitoring of the quality of the attachment. The attachment body comprises an attachment portion which in particular comprises the part of the attachment body which is partially or fully inserted in the support element. Thus, the attachment portion is attached by a screw connection, a material connection (by adhesive or concrete) or a pressing connection in an opening of the support element. Correspondingly, the attachment portion may comprise a thread portion or the like, for example. The attachment body may also be fully inserted in the support element, for example molded in the support element, and the coupling portion may be coupled with an evaluation unit which is arranged outside in terms of signaling.

Furthermore, the attachment body comprises a coupling portion which is formed for example in the interior of the attachment body or in a region of the attachment body which protrudes out of the support element in the attachment state. The coupling portion comprises the units which are necessary for the energy supply into the conductor trace and for the signal exchange with the environment. In particular, the coupling portion is accessible and/or visible from outside in the attached state of the device. Furthermore, the coupling portion may comprise a part of the attachment body which is entirely present in the support element and is coupleable by wireless connection technology with the environment of the support element.

For measuring the quality of the attachment between the device and the support element, at the attachment portion, a conductor trace is arranged in a trace-shaped extension, which is supplied with electric energy, in particular from the coupling portion. The term "applying a conductor trace" for example denotes that the conductor trace is applied (for example glued) on the attachment portion already in a solid state (relaxed or stretched). Furthermore, the term "applying a conductor trace" denotes that the conductor trace is supplied as a semifinished product, for example in a liquid state, by a screen printing method, a gravure printing method, or by an ink jet printing method on the attachment portion.

Furthermore, also in the attachment portion itself an energy source, such as a battery, may be provided. Energy could also be supplied in a wireless manner "remotely" in terms of RFID technology. The conductor trace consists of an electrically conductive material and a dense arrangement of electrically conductive particles, respectively, such as copper, aluminum or silver. The conductor traces may be applied on a (elastomeric) substrate based on a metal which is initially liquid. The liquid metal may comprise a (eutectic) metal alloy. Galinstan is a, e.g. eutectic, alloy made of gallium, indium and tin. For example, the alloy may contain a larger amount of gallium than an amount of indium or tin. For example, the alloy may be an alloy which contains 65 to 68 weight percent gallium, 5 to 22 weight percent indium and 1 to 11 weight percent tin. Furthermore, conductive carbon particles, e.g. nanotubes, or soot (German: Ruß) may be used. In an embodiment, a metal precursor is applied on a surface of the elastomer substrate. The metal precursor may encompass a salt and a salt solution of a metal (e.g. silver), respectively, or a complex of a metal. In an embodiment, the rigid metal layer encompasses at least one element (or metal) which is selected from the group consisting of copper, silver, gold, and platinum. For example, structured metal traces are applied on the attachment portion and subsequently, Galinstan is formed on the metal traces in an immersion bath. In addition, the conductor trace may consist of a conductive ink which is subsequently described. The conductor trace may be supplied with electric energy such that an electrical resistance of the conductor trace is measurable.

The conductor trace is fixed on the attachment portion such that the conductor trace correspondingly follows deformations and motions of the attachment portion, respectively. When the attachment portion is compressed, stretched or interrupted, the conductor trace deforms correspondingly. A corresponding deformation of the conductor trace correspondingly leads to a change of the conductive cross section of the conductor trace and additionally to a change of the density of the conductive particles in the conductor trace, such that correspondingly a change in resistance of the conductor trace is caused. Correspondingly, a change in resistance of the conductor trace is indicative for a deformation of the conductor trace itself and correspondingly of the attachment portion.

For example, after an initial attachment of the device at the support element, the resistance of the conductor trace may be measured. The measured resistance of the correspondingly new and intact attachment is taken as basis for a target value and initial value, respectively. The change of the resistance changes with the quantity of the deformation of the conductor trace and correspondingly of the attachment portion. Finally, a breakage and a separation of the attachment portion, respectively, and correspondingly of the conductor trace forms an interruption of the conductivity of the conductor trace and thus indicates a destruction of the attachment. Thus, in routine controls of the device, the deviation of a measured resistance of the conductor trace with respect to the initial target value may be measured and, in case of exceeding or falling below a particular boundary value and value, respectively, the device may be readjusted or replaced. A conductor trace may be applied on a corresponding attachment portion in a robust and cost-efficient manner, such that a secure and cost-saving condition monitoring for devices is provided by embodiments of the present invention.

An evaluation unit may be detachably coupled or fixed to the coupling portion, to measure the electrical resistance of the conductor trace. For example, the evaluation unit may generate an indication signal which gives an information about the quality of the attachment and the device, respectively. In other words, the evaluation unit analyzes the measured resistances of the conductor trace and compares them with pregiven target values of the resistances. When a resistance of the conductor trace changes above a pregiven threshold value, the evaluation unit generates corresponding indication signals. The evaluation unit may be an integral component of the device itself or may be coupled to the coupling portion as an external evaluation unit, to read the data concerning the resistances of the conductor trace.

In particular, the device may be integrally formed, wherein the coupling portion and the attachment portion are configured integrally and monolithically, respectively. Alternatively, the device may be configured in a modular manner, such that the attachment portion and the coupling portion are formed separately from each other. The attachment portion and the coupling portion may be detachably coupled with each other, for example. For example, the attachment portion remains in the support element and, exclusively in case of controls, the coupling portion is coupled to the attachment portion, to measure the resistance of the conductor trace.

According to a further exemplary embodiment, the conductor trace comprises a carrier material in which conductive particles are embedded. For example, the carrier material consists of a rigid or highly viscous material in which conductive particles are present in a certain density and a certain arrangement with respect to each other, respectively. The density of the conductive particles determines the electric conductivity and correspondingly also a certain resistance. A corresponding carrier material with conductive particles may be applied as liquid or viscous conductive ink on the attachment region.

The term "conductive ink" denotes a material combination which comprises a carrier material in which conductive particles are introduced, such as silver-, aluminum-, or copper particles, and are present in the carrier material. The carrier material consists of a viscous fluid, for example, which cures or evaporates after applying the conductive ink, for example, such that the particles of the conductive ink themselves are adhered to a surface of the attachment portion.

According to a further exemplary embodiment of the method, the conductor trace is applied which is manufactured from electrically conductive ink comprising the carrier material which comprises dissolved conductive particles. The electrically conductive ink is applied on the attachment portion in a liquid state.

The applied carrier material is solidified, such that the arrangement of the conductive particles in the carrier material is fixed.

The carrier material may be present in the conductive ink as a liquid monomer which is polymerized later, or as polymer. In the liquid carrier material, the conductive particles are present in a dissolved manner or as a salt solution (e.g. silver salt solution). Subsequently, the carrier material is solidified, e.g. by adding a further binder, by a thermal treatment and/or by radiation (e.g. light, UV-light) and the density and the arrangement of the conductive particles in the carrier material, respectively, is fixed. As described below in more detail, the conductive ink may be efficiently applied on the attachment portion in a technologically simple manner, wherein arbitrary extensions of the conductor trace are possible. In the conductive ink, the conductive particles are packed so densely that a constant electrical conductivity between the particles is present. In case of a deformation (stretching, constriction, or compression) of the conductor trace, the conductive particles are regionally packed more densely or less densely, whereby the electrical resistance is correspondingly influenced. Based on this changed electrical resistance, the type and size of the deformation of the attachment portion may be concluded.

The conductor trace which is made of conductive ink, for example, may consist of a conductive composite material, wherein a polymeric part (carrier material), e.g. made of plastic resin, is responsible for the stretchability, while e.g. percolated conductive filling agents/particles allow for an efficient charge transfer. Conductive filling agents may be based on carbon (e.g. graphite, amorphous carbon, carbon nanotubes (CNTs), graphene, pyrolyzed bacteria cellulose) or may be metallic (e.g. metal nanowires, micro-flakes, micro-powders, micro-flower or nanoparticles).

The conductive ink which provides a source for transition metal ions, a reducing agent and/or a reduced compound, and a dissolved polymer or a polymerizable polymer precursor, in particular a monomer, in a thermal treatment, by a reduction of the transition metal ions and a polymerizing reaction (in case of a polymerizable polymer precursor) may in situ lead to the formation of a percolated network made of metal-nano- or microstructure or embedded metal-nanoparticles (in particular homogenously dispersed) in a polymer matrix (of a previously dissolved polymer or, in case of a polymerizable polymer, precursor of the polymer which is formed in the polymerization). The space between the metallic structures (particles) may be filled by the polymer and may contribute to the formation of a polymer network which connects ("adheres") these metallic structures with each other. In a similar manner, in case of a dissolved polymer, it may also fill the space between these metallic structures. Thereby, a composite material may be obtained which may also be denoted as "in situ nano composite" (ISNC), which comprises an electrical conductivity (with respect to the metallic structure or nanoparticles) and a deformability and elasticity. Flexibility, stretchability or plasticity (with respect to the polymer matrix), thereby they may also be denoted as plastic or elastic conductor. The electrical conductivity of the such obtained ISNCs may also remain in case of high stretching values (for example it may be stretchable with a very low relative resistance ratio, defined as R/R0, up to 200 percent, wherein R and R0 are the resistance values with a given degree of stretching and the resistance in case of 0% stretching), however monotonously decreases during the stretching process. After the release, the conductivity may return back to the original value, and after multiple stretching- and release cycles, only a small change is caused. Moreover, the conductive ink may firmly adhere to the surface of the deformed substrate after the thermal treatment.

The metal particles (e.g. silver particles) are thus kept in an elastomeric matrix of the carrier material and are correspondingly more or less spaced in case of compression or stretching, such that the resistance is influenced. Furthermore, the reduction of the bandwidth in case of stretching plays a role for the change in resistance.

The conductor trace and in particular the conductor trace made of conductive ink may be applied with a thickness of 1 µm to 100 µm (micrometer). The conductive ink may be applied in a simple manner and comprises a high sensitivity. In particular, the conductor trace may be applied over a partial region of the attachment portion or over the entire attachment portion.

According to a further exemplary embodiment, the trace-shaped extension of the conductor trace protrudes in the coupling portion, such that an electrical conductivity between the conductor trace in the coupling portion and the attachment portion is present. Thus, the conductor trace may be supplied with energy from the coupling portion and a corresponding change in resistance may be read.

According to a further exemplary embodiment, the conductor trace establishes at least two electrical contacts in the coupling portion, wherein the trace-shaped extension of the conductor trace extends from one of the electrical contacts via the attachment portion to the other electrical contact. The conductor trace thus extends in a loop-shape from one end of the attachment portion at which the coupling portion is coupled and the first electrical contact is present, to an opposing end of the attachment portion and again back to the second electrical contact. Thus, a voltage source may centrally supply the required electric energy for the resistance measurement from the coupling portion.

According to a further exemplary embodiment, the trace-shaped extension of the conductor trace in the attachment portion extends at least partially in a meander-shaped manner. Thus, a large part of the surface of the attachment portion may be covered with the conductor trace, such that the probability of measuring local deformations is increased. In addition, the sensitivity of the conductor trace is increased.

According to a further exemplary embodiment, the width of the trace-shaped extension is in particular between 20 µm (micrometer) and 2500 µm, in particular between 25 µm and 2000 µm.

According to a further exemplary embodiment, at least two trace portions of the trace-shaped extension of the conductor trace comprise different trace widths with respect to each other. In particular, the conductor trace may comprise one or a plurality of constrictions (German: Einschnürungen) and taperings (German: Verjüngungen), respectively, at certain positions of the attachment portion.

When the presence of the position of the taperings is known, the location of the deformation may be exactly determined in case of a certain change in resistance. By the location of the taperings, the preferred direction of the tapered resistance traces of the conductor trace and thus the directional dependency of the sensitivity may be determined.

According to a further exemplary embodiment, between the surface of the attachment portion and the conductor trace, an electrically isolating isolating layer is arranged. In particular, the isolating layer comprises a polymer substrate, in particular a thermoplast film and/or an elastomer film. Thus, disturbances in the resistance measurements may be reduced based on electric currents between the conductor trace and the attachment portion. The layer thickness of the isolating layer may be between 1 µm (micrometer) to 10000 µm, in particular 15 µm to 5000 µm, for example.

The material of the elastomer substrate is elastic (or flexible) and may carry a rigid metal layer (or the alloy which is formed later) on its surface. For example, the material of the elastomer substrate may at least encompass one polymer material. In particular, suitable examples for the material of the elastomer substrate may be thermoplast, thermoset (German: Duroplast), and composite materials. In particular, suitable examples for the material of the elastomer substrate encompass polyurethanes, polyurethane (meth)acrylate, PEG-(meth)acrylate; polyesters such as polyethylene terephtalate (PET), polyethylene naphthalate (PEN), polycarbonate (PC); polysulfones such as polyether sulfone (PES); polyacrylates (PAR); polycyclic olefins (PCO); polyimide (PI); polyolefins such as polyethylene (PE), polypropylene (PP); vinyl polymer such as polystyrene (PS), polyvinylchloride (PVC), polymethyl methacrylate (PMMA); polyamides; polyether; poly ketones such as aromatic polyether ketone (e.g. PEK); poly sulfides (e.g. PPS); fluoropolymers (P (VDF) such as P (VDF-TrFE), which may be especially suitable when they are used for a piezoelectric sensor), polytetrafluoroethylene (such as PTFE), fluorinated ethylene propylene (FEP); liquid crystal polymers; poly epoxides; polysiloxanes (e.g. PDSM); rubber materials such as natural rubber (NR), synthetic natural rubber (IR), nitrile butadiene rubber (NBR), carboxylated nitrile butadiene rubber (XNBR), styrene butadiene rubber (SBR), and other rubber materials made of polymer dispersions and rubber or synthetic rubber latices; biopolymers or combinations, copolymers and/or mixtures thereof. In particular, the material of the elastomer substrate may encompass a thermoplastic polyurethane.

In an embodiment, the elastomer substrate may comprise a tensile modulus of not more than 250 MPa, in particular not more than 200 MPa. The lower limit of the tensile modulus of the elastomer substrate is not especially limited, as long as the elastomer substrate is able to carry a rigid metal layer (or the alloy which is formed later) on its surface. In particular, the elastomer substrate may comprise a tensile modulus of not less than 25 MPA, in particular not less than 50 MPA. The tensile modulus of the elastomer substrate may be determined according to ISO 527-1 and 527-3, for example.

According to a further exemplary embodiment, the conductor trace is configured elastically and the conductor trace is applied on the attachment portion in a stretched and biased state. In the non-deformed initial state of the attachment portion, the elastic conductor trace is thus present in a stretched manner and under bias. Therefore, the conductive particles of the conductor trace in the initial state are in particular more distanced from each other and an elastomeric restoring force attempts to pull the conductive particles together. When the attachment portion is compressed now, due to the restoring force, the conductive particles of the conductor trace are pushed closer to each other. Therefore, the conductivity of the conductor trace is increased and the electrical resistance is correspondingly reduced. Thus, besides stretching and breakages of the attachment portion, also compressions may be measured in an improved manner. In comparison, when the conductor trace is applied on the attachment portion in an unstretched manner, in case of a compression, the conductive particles have to be pushed together. However, this is impeded by an unstretched matrix, for example, in which the conductive particles are embedded, such that even in case of a strong compression, the conductive particles are only slightly pushed together.

The conductor trace which comprises conductive particles which are embedded in a matrix as carrier material, for example, may be stretched before applying on the attachment portion and may be applied on an unstretched (elastomeric) substrate and isolating layer, respectively. Furthermore, the conductor trace may be applied in the unstretched state on an unstretched elastomeric substrate. Subsequently, the substrate may be stretched together with the conductor trace and may be applied in this stretched and biased state on the attachment portion.

According to a further exemplary embodiment, the attachment portion comprises a groove in which the conductor trace is arranged. In other words, the conductor trace is not directly arranged on the outermost surface of the attachment portion, but in an inner surface of the attachment portion within the groove. The conductor trace may be attached at sidewalls of the groove or at the bottom surface of the groove. Thus, the conductor trace may be protected against outer influences.

In a further exemplary embodiment, the groove in particular comprises an undercut, wherein the conductor trace is arranged at an inner surface of the undercut.

According to a further exemplary embodiment, the groove is filled with a sealing material, wherein the sealing material in particular comprises silicone, polyurethane and/or acrylic resin. Thus, the protection of the conductor trace against outer influences is increased.

According to a further exemplary embodiment, in the coupling portion, a control circuit for controlling a current in the conductor trace is arranged. Furthermore, the control circuit may be a part of the evaluation unit. In particular, the control circuit controls the electric energy supply in the conductor trace. Furthermore, by the control circuit, the electric energy may be introduced in the conductor trace in a constant or pulsed manner, for example. Furthermore, the control circuit may supply direct current or alternating current in predetermined frequencies in the conductor trace.

The control circuit may be integrated or detachably attached in the coupling portion. For example, the control circuit may comprise electronic components, such as relays or processors.

According to a further exemplary embodiment, the control circuit is printed in the coupling portion on its surface. Furthermore, the control circuit may be attached and printed, respectively, on a flexible substrate, such as a self-adhering film, wherein the self-adhering film may be attached in the coupling region.

According to a further exemplary embodiment, the control circuit comprises a radio module for transmitting signals concerning the resistance of the conductor trace to an external evaluation unit which is spaced apart. In particular, the radio module is configured to transmit the signals to an evaluation unit in a wireless manner. In particular, the radio module may form a Bluetooth module, an induction module, or an RFID module, to transmit the signals.

According to a further exemplary embodiment, the attachment body comprises an interface element for an energy source and/or for an external evaluation unit in the coupling portion. In particular, the interface element comprises a USB-port, an induction loop, or an RFID interface. For example, energy for the conductor trace may be inductively introduced from outside into the coupling portion. Furthermore, the measured signals concerning the resistance of the conductor trace may be transmitted via RFID-modules. Additionally, as previously described, a radio module may be provided, to transmit corresponding signals, for example via Bluetooth or other wireless connection technologies. Furthermore, the interface element, besides a wireless signal transmission, may also comprise devices for a wired signal transmission. The interface element may form a USB-port, a serial port, or a light guide port, for example.

The external evaluation unit may constitute a mobile evaluation unit, for example, such as a mobile computer unit, e.g. a tablet computer or a smart phone. The corresponding signals concerning the resistances of the conductor trace and its change in resistance, respectively, may be transmitted in a wireless manner, as previously described. Furthermore, a wired connection to the mobile evaluation unit may be established also via standardized interfaces. Furthermore, the corresponding signals may also be transmitted to a control center which may centrally monitor the conditions of single devices in real time. Correspondingly, the condition of devices may be read and controlled in a simple manner.

According to a further exemplary embodiment, an evaluation unit is arranged in the coupling portion, which is configured to measure changes in resistance of the conductor trace. In this exemplary embodiment, the evaluation unit is integrated in the coupling portion. The evaluation unit receives the signals of the corresponding resistances of the conductor trace and determines if the deviation of the electrical resistance in the conductor trace is within the boundary values or exceeds a certain boundary value. The evaluation unit may subsequently forward the evaluated data concerning the change in resistance of the conductor trace to a control- and monitoring device, respectively.

According to a further exemplary embodiment, the evaluation comprises a signal element, wherein the signal element is configured to output an indication signal, in particular a visual or acoustic indication signal, based on a detected change in resistance. For example, the signal element may constitute a sound outputting loudspeaker or an optical element, such as an LED, to reflect the condition of the device. For example, if the evaluation unit detects that certain boundary values of the change in resistance of the conductor trace are exceeded, an alert signal as indication signal may be acoustically output. Furthermore, for example when a change in resistance of the conductor trace within the boundary values is present, a certain color of light as indication signal may be output. For example, in this case an LED may light up in green. When a boundary value of the change in resistance is exceeded, the color of light is adapted, for example by an LED having a red light. According to a further exemplary embodiment, the attachment body comprises an energy source, in particular a battery, for supplying electric energy in the conductor trace. In particular, the energy source may be rechargeable by providing additional photovoltaic elements, for example. Alternatively, a corresponding energy source may be coupled to the coupling portion together with an external evaluation unit, to supply the conductor trace with electric energy.

According to a further exemplary embodiment, the attachment body is at least partially encapsulated by a protective layer, in particular consisting of an encapsulation material or a protective lacquer.

According to a further exemplary embodiment, the device is configured as a rock anchor device and the attachment body as rock anchor, such that the object, in particular a tubbing (German: Tübbing), is attachable at the support element, in particular a rock wall or a support wall, by the attachment portion. Furthermore, the attachment body may be configured as supporting anchor, to stabilize the support element, for example a rock wall. The attachment portion is inserted in a bore hole of the support element and is fixed by a press connection or a material connection, for example by mortar (German: Mörtel) or resin. For example, an object to be attached, such as a tunnel lining and a tubbing, respectively, may be fixed at the rock anchor. The coupling portion may be visible and accessible from outside and/or hidden and readable in terms of signals, such that the changes of the electrical resistance of the conductor trace along the attachment portion may be evaluated by an evaluation unit.

According to a further exemplary embodiment, the attachment body is configured as a supporting anchor, such that the attachment portion, for stabilizing the support element, in particular a rock wall or a support wall, is inserted in it. Driving-in a support supporting or inserting a supporting anchor in a bore hole with subsequently gluing or mortaring in a rock wall or any other support wall leads to a solidification and to a retention. By the inventive supporting anchor, there is the possibility to detect motions of the rock wall, for example, and thus to early detect an instability of the same.

According to a further exemplary embodiment, the attachment body is configured as a reinforcing rod, such that the support element, in particular a concrete element, is stabilizable by the attachment portion. The reinforcing rod may constitute a rod made of metal, in particular steel (reinforcing steel, armoring iron), or a rod made of a rigid fiber, in particular carbon fiber material and may be utilized in a hybrid material. For example, the reinforcing rod may be utilized in a concrete mass for forming reinforced concrete (German: Stahlbeton). For this purpose, for example all or just some reinforcing rods may be configured according to embodiments of the present invention, and may be placed in a building, such as a high-rise building or a bridge. Subsequently, concrete may correspondingly be casted around the reinforcing rods. During the lifetime of the building, the electrical resistances of the inventive reinforcing rods may be read, such that the construction-technical condition of the reinforced concrete may be concluded. Thus, a real-time monitoring of the condition of the building may be realized. The data concerning the electrical resistances of the reinforcing rods may be read continuously or in certain control periods. Due to the plurality of used reinforcing rods in a building, a plurality of measuring points at different measuring points (for example more than 1000 measuring points) in a building may thus be generated, such that a precise condition monitoring of the building is possible.

Correspondingly, the reinforcing rod comprises an attachment portion which is enclosed by the construction mass and concrete mass, respectively. The conductor trace is applied on the attachment portion and/or in a groove and in an opening of the attachment portion, respectively. For a better protection, the coupling portion may also be formed in the interior of the attachment body of the reinforcing rod. In particular, the interface element may comprise an induction loop and/or an RFID interface in the coupling portion, to inductively introduce energy for the conductor trace from outside into the coupling portion. Furthermore, the measured signals concerning the resistance of the conductor trace may be transmitted in a wireless manner via the interface element (e.g. comprising an RFID-module).

According to further exemplary embodiment, the device is a device and the attachment body is configured as a screwing element, a bolt element or a dowel element, such that the object is attachable to the support element, in particular a building wall, by the attachment portion.

For example, the bolt element is attached in the support element, i.e. the connection partner, such as a building wall, by a press fit (German: Presspassung). When the pressing force in the press fit changes, for example due to a deformation of the receiving hole, in which the bolt element is attached, also the electrical resistance in the conductor trace changes, such that a quality, for example a decrease of the pressing connection, may be measured.

At the device as screwing element, an outer thread may be provided on the surface of the attachment portion. Along the longitudinal extension of the screwing element, a narrow groove in which the conductor trace is present may be milled through the thread pitches (German: Gewindegänge). The screwing element may be screwed into a connection partner, such as a dowel or a bore hole with a corresponding thread. Depending on the quantity of the torque by which the screwing element is screwed into the bore hole, a corresponding connection force between the connection partners is generated. This leads also to a corresponding deformation of the screwing element. In a present screwing connection, a decrease of the connection force may be measured, since a corresponding decrease of the connection force leads to a slight deformation of the connection partners and correspondingly also of the conductor trace, such that in turn changes in resistance are measurizable. Furthermore, during screwing a screwing element, it may be examined if a desired and pregiven torque, respectively, was achieved during screwing the screwing element. Since applying a torque on a screwing element leads to a predeterminable deformation of the screwing element and correspondingly of the conductor trace, a corresponding measurement of the change in resistance is enabled. Besides monitoring an existing screwing connection, it may be additionally examined if during the installation of a screwing element, the pregiven torque was applied.

When the device is configured as a dowel element, the part which is arranged inside may be defined as attachment portion and the outermost part and/or the part which is arranged outside with respect to a bore hole may defined as coupling portion. At the inner side or at the outer side of the dowel element, the conductor trace may be correspondingly applied. For this purpose, the dowel element may comprise correspondingly narrow grooves in which respective conductor traces are provided. When an attachment means, such as a screw or a bolt, is driven in the dowel, the attachment portion of the dowel element and correspondingly the conductor trace expands. This leads to a measurable change in resistance again which is indicative for the quality of the attachment of the dowel to the attachment element.

According to a further exemplary embodiment of the method, the conductive ink is applied on the attachment portion by a screen printing method, a gravure printing method, or by an ink jet printing method.

By a printing method, such as by screen printing or ink jet printing, the conductive ink is applied on polymeric substrates, such as a thermoplast film or an elastomer film, with a layer thickness between 1 µm (micrometer) and 10000 µm, preferably between 25 µm and 5000 µm. Thereby, a conductor trace as stretching sensor is generated whose printed length is adapted to the attachment portion (anchor, screw, or dowel). The stretching sensors have printed end contacts (for a connection with an electronic circuit). Optionally, also a suitable electronic circuit (evaluation unit) for capturing in terms of measuring the change in resistance of the conductor trace and stretching sensors, respectively, are co-printed. The such manufactured stretching sensors are encapsulated (by laminating or by applying a protective lacquer). The stretching sensors are then glued in a groove which is milled in the attachment portion, e.g. anchor, are guided to the coupling portion (for example the anchor head or the screw head), and are connected to an electronic at the coupling portion.

A sealing material (preferably on polymer basis, for example silicone, polyurethane, or an acrylic resin), is applied on the glued stretching sensor (conductor trace) for means of protection, and is caused to harden, if necessary.

The manufacture of the laminated stretching sensors (conductor traces) is performed on the substrate almost in an endless manner with the respectively adjusted lengths. Then, the laminated stretching sensors are rolled up. In a further manufacturing stage, the stretching sensors are unrolled and glued into the anchor groove. Correspondingly, according to a further exemplary embodiment of the method, it is described that the conductor trace is present in a substrate, wherein applying a conductor trace along the trace-shaped extension comprises gluing the substrate on the attachment portion.

Alternatively to printing the electrically conductive ink on a polymeric substrate and subsequently laminating, in a first stage, at first a polymeric substrate may be applied directly on the anchor (e.g. by printing, coating made of a liquid phase, or another method), then in a second stage the conductive ink, in a third stage, the encapsulation is performed directly on the anchor, in a fourth stage, applying a protective layer is performed, and in a fifth stage, connecting the electronic (printed or electrotechnical) is performed.

With the mentioned printing- and coating methods, hardening stages and cross-linking stages which are initiated thermally or by radiation (e.g. by UV-light) may be connected.

In the following, installing and operating the device as rock anchor is described. The anchor is inserted and anchored in the rock or the building. Directly after anchoring, the anchor has a "tension condition zero". When a diode is connected to the anchor head, it shows a green light. Alternatively, the "tension condition zero" is wirelessly transmitted by an electronic.

When the rock or other material which surrounds the anchor starts to move and the anchor is thereby loaded in terms of tensile stress or shearing, the tension condition in the anchor changes in comparison to the tension condition "zero". This change of the tension condition also acts upon the stretching sensor made of conductive ink which was glued in the anchor groove or printed directly on the anchor. The conductive ink changes its resistance. The change in resistance is transferred to the connected electronic and is either indicated by the electronic via the electronic circuit in form of a light color change at the anchor head, or wirelessly transmitted as a measuring value to a system. The change in color is adjusted proportionally to the increase of the tension in the anchor.

When the anchor tears or breaks, the resistance of the stretching sensor changes to an infinitely high value. This is also directly indicated in form of a change of the color of light or a flashing light source or an acoustic signal or another kind of signal.

According to embodiments of the present invention, electrically conductive ink is applied in an anchor groove or printed on the anchor for manufacturing a stretching sensor. By embodiments of the present invention, using electrically conductive ink on anchors for the purpose of measurements of anchor deformations and also the type of the application and the indication of the stretching at the anchor head is described for the first time. This encompasses the electronic translation of the change in stretching in a color code and triggering an acoustic signal in the case of the breakage of the anchor.

Elastomer-based stretching sensors based on conductive ink are very sensitive with respect to low stretchings. This is highly advantageous in case of the application on the device and the anchor, respectively. A further substantial, disruptive advantage are the low costs of the application of stretching sensors on basis of conductive ink on anchors. The stretching sensors consist only of a conductive line (conductive ink) which may comprise taperings at certain positions. By the position of the taperings and the preferred direction of the tapered resistance traces, respectively, the directional dependency of the sensitivity may be determined.

It is noted that the embodiments described herein merely constitute a restricted selection of possible embodiment variants of the invention. It is also possible to combine the features of single embodiments with each other in a suitable manner, so that, for the skilled person, by the explicit embodiment variants, a plurality of different embodiments are to be considered as obviously disclosed. In particular, some embodiments of the invention are described with device claims and other embodiments of the invention are described with method claims. However, when reading this application, it is immediately clear for the skilled person that, unless otherwise specified, additionally to a combination of features which belong to one type of inventive subject matter, also an arbitrary combination of features is possible which belong to different types of inventive subject matters.

DETAILED DESCRIPTION OF EXEMPLARY EMBODIMENTS

In the following, for further explanation and for a better understanding of embodiments of the present invention, embodiments are described in more detail with reference to the accompanied drawings. It is shown by:

FIG. 1 a schematic illustration of a device as rock anchor which is attached in a rock wall, according to an exemplary embodiment of the present invention.

Figure 2:
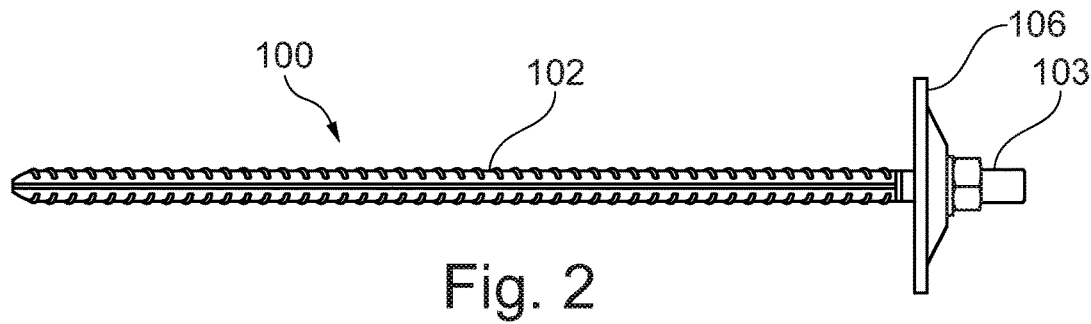

FIG. 2 a schematic illustration of a device as rock anchor of FIG. 1.

Figure 3:
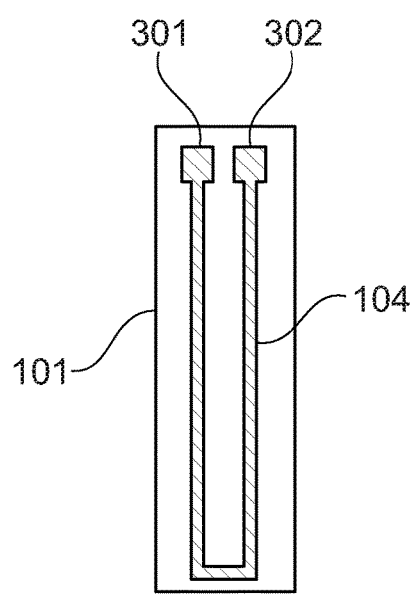

FIG. 3 a schematic illustration of an extension of the conductor trace according to an exemplary embodiment of the present invention.

Figure 4:
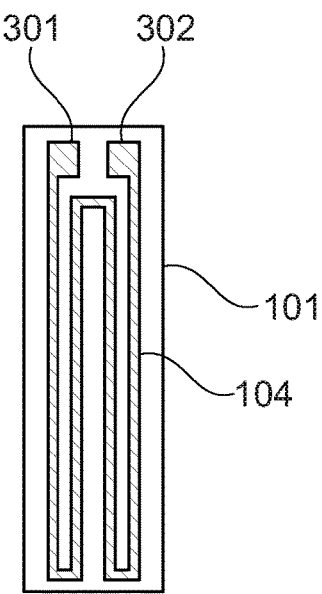

FIG. 4 a schematic illustration of a meander-shaped extension of the conductor trace according to an exemplary embodiment of the present invention.

Figure 5:
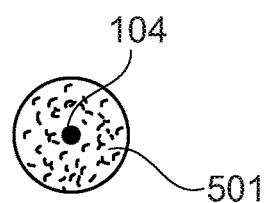

FIG. 5 a schematic illustration of a conductor trace surrounded by a substrate according to an exemplary embodiment of the present invention.

Figure 6:
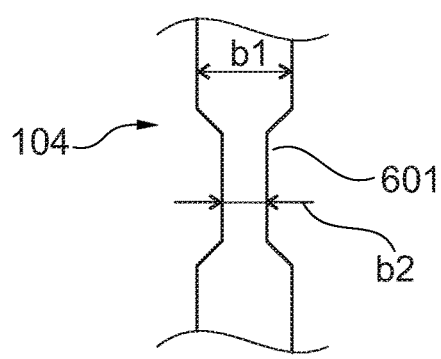

FIG. 6 a schematic illustration of the conductor trace with a constriction according to an exemplary embodiment of the present invention.

Figure 7:
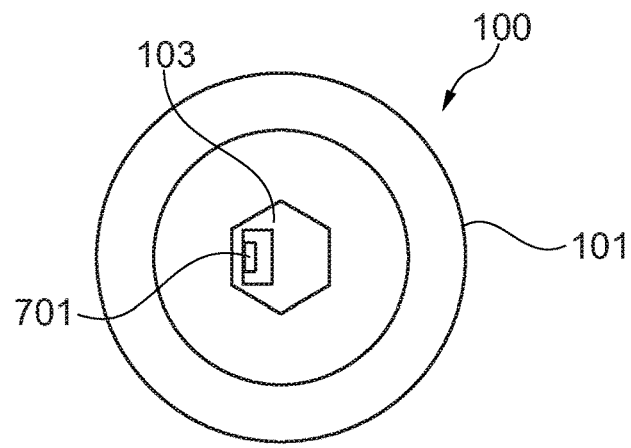

FIG. 7 a schematic illustration of the coupling portion with an interface element according to an exemplary embodiment of the present invention.

Figure 8:
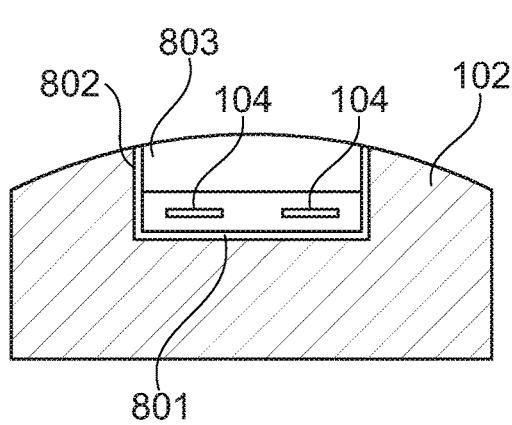

FIG. 8 a schematic sectional view of an attachment portion with a groove according to an exemplary embodiment of the present invention.

Figure 9:
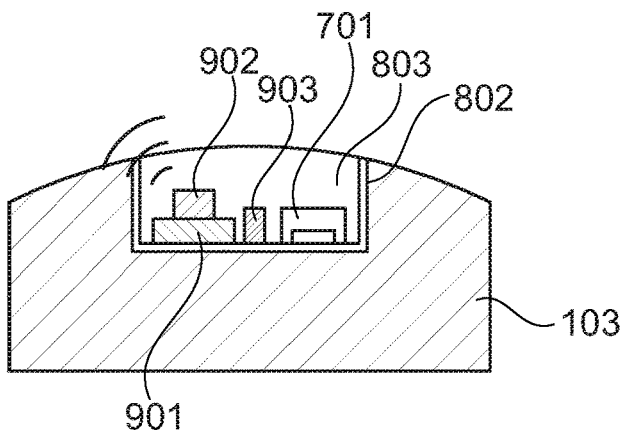

FIG. 9 a schematic sectional view of the coupling portion with a groove according to an exemplary embodiment of the present invention.

Figure 10:
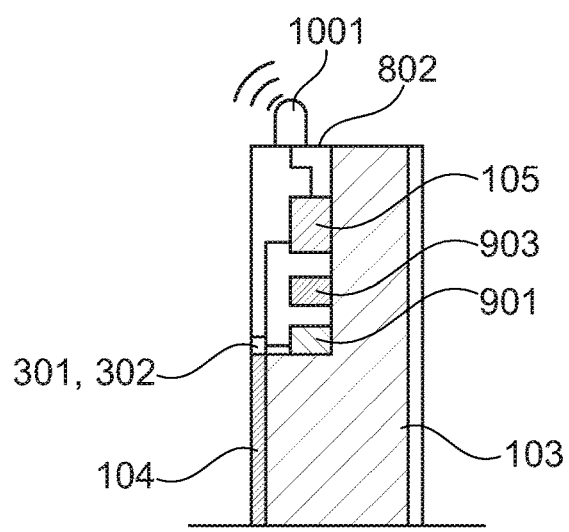

FIG. 10 a schematic sectional view of the coupling portion with a groove in which an evaluation unit is arranged, according to an exemplary embodiment of the present invention.

Figure 11:
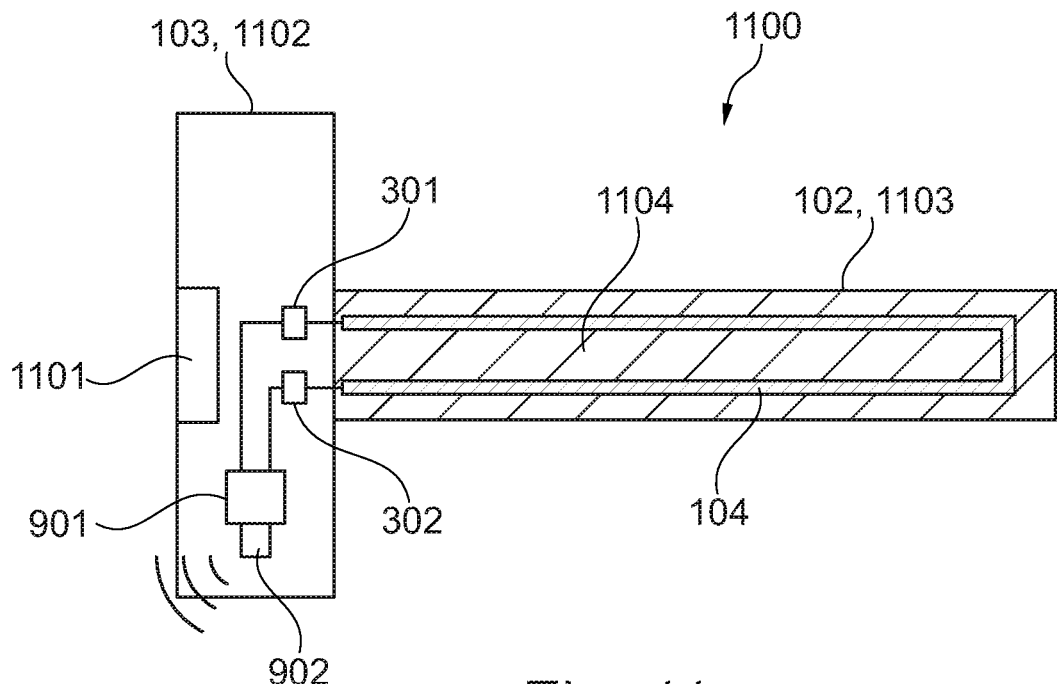

FIG. 11 a schematic illustration of a device as a screw device according to an exemplary embodiment of the present invention.

Figure 12:
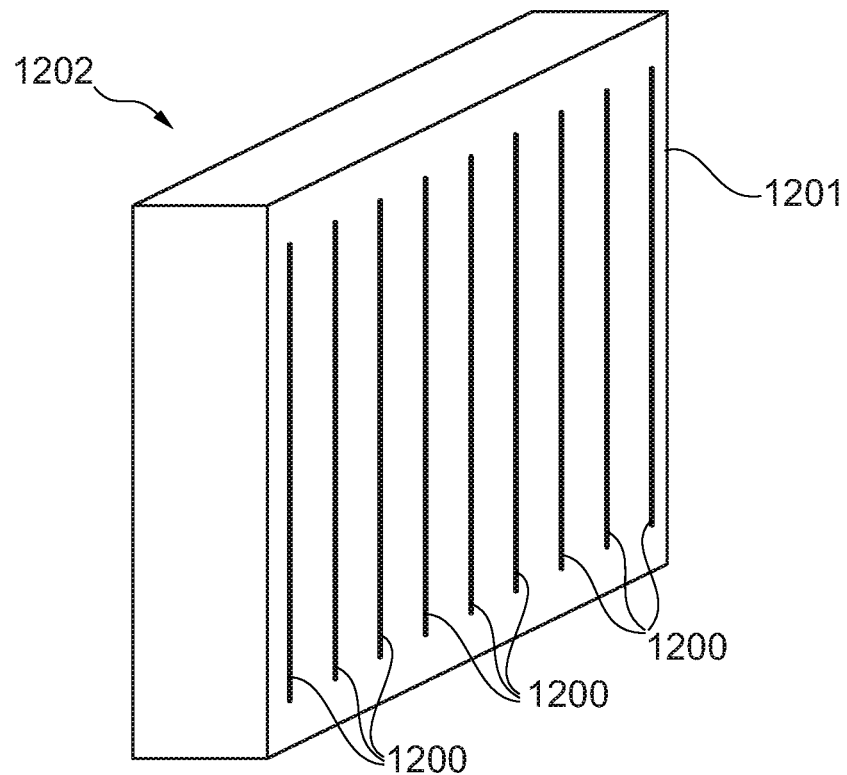

FIG. 12 a schematic illustration of a device as a reinforcing rod according to an exemplary embodiment of the present invention.

Same or similar components in different figures are provided with the same reference numbers. The illustrations in the figures are schematic.

FIG. 1 and FIG. 2 show a device as a rock anchor 100 which is attached in a rock wall as support element 160. The device 100 reinforces or attaches in particular a rock surface or a rock surface which is sealed with a grid or sprayed concrete or a tubbing as object 150, wherein the device 100 comprises a condition monitoring for determining a deformation. The device 100 comprises an attachment body 101 with an attachment portion 102 for inserting in the support element 160 and a conductor trace 104 which is electrically conductive and is applied along a trace-shaped extension at the attachment portion 102 for measuring a mechanical tension. The attachment body 101 comprises a coupling portion 103 for coupling with an evaluation unit 105. The conductor trace 104 is configured such that it is suppliable from the coupling portion 103 with electric energy, wherein the electrical resistance of the conductor trace 104 is indicative for the deformation of the attachment body 101 in the attachment portion 102.

The device comprises a condition monitoring of the quality of the attachment, in particular between the tubbing as object 150 to be attached and the rock wall as support element 160. The attachment body comprises an attachment portion 102 which in particular comprises the part of the attachment body 101 which is partially or entirely inserted in the support element 160. Furthermore, the attachment portion 102 is attached in an opening of the support element 160 by a material connection, such as by a mortar 151 in the present case.

Furthermore, the device may comprise an attachment plate 106 which pushes the object 150 against the support element 160.

Furthermore, the attachment body 101 comprises a coupling portion 103 which is formed in a region of the attachment body 101 which protrudes out of the support element 160 in the attached state. In particular, the coupling portion 103 is accessible and/or visible from outside in the attached state of the device.

For measuring the quality of the attachment between the device and the support element 160, a conductor trace 104 which is supplied with electric energy, in particular from the coupling portion 102, is arranged in a trace-shaped extension at the attachment portion 102. The conductor trace 104 is supplied with electric energy, such that an electrical resistance of the conductor trace 104 is measurable.

The conductor trace 104 is fixed on the attachment portion, such that the conductor trace follows corresponding deformations and bendings, respectively, of the attachment portion 102. When the attachment portion 102 is compressed, stretched, or interrupted, the conductor trace 104 correspondingly deforms. A change in resistance of the conductor trace 104 is indicative for the deformation of the conductor trace 104 itself and corresponding of the attachment portion 103.

For example, after the initial attachment of the device to the support element 160, the resistance of the conductor trace 104 may be measured. The measured resistance of the correspondingly new and intact attachment is taken as basis for a target value and initial value, respectively. The change of the resistance changes with the magnitude of the deformation of the conductor trace 100 and correspondingly of the attachment portion 102. Finally, a breakage and a separation, respectively, of the attachment portion and correspondingly of the conductor trace 104 forms an interruption of the conductivity of the conductor trace 104 and thus shows a destruction of the attachment.

An evaluation unit 105 may be detachably coupled or fixed to the coupling portion 103 to measure and evaluate the electrical resistance of the conductor trace. For example, the evaluation unit 105 may generate an indication signal which gives an information about the quality of the attachment and the device, respectively.

The device which is embodied as anchor and rock anchor device 100, respectively, in the present example, in particular may be configured made of one piece, wherein the coupling portion 103 and the attachment portion 102 are configured integrally and monolithically, respectively. Alternatively, the device may be configured in a modular manner, such that the attachment portion 102 and the coupling portion 103 are formed separately from each other. The attachment portion 102 and the coupling portion may be detachably coupled with each other, for example. For example, the attachment portion 102 remains in the support element 160 and, exclusively in case of controls, the coupling portion 103 is coupled to the attachment portion 102, to measure the resistance of the conductor trace 104. In particular, the conductor trace 104 is made of conductive ink.

As illustrated in the embodiment in FIG. 1, the trace-shaped extension of the conductor trace 104 protrudes in the coupling portion 102, such that an electrical conductivity between the conductor trace 104 in the coupling portion 103 and the attachment portion 102 is present. From the coupling portion 103, the conductor trace 104 may be supplied with energy and a corresponding change in resistance may be read.

The attachment body 102 is at least partially encapsulated by a protective layer, in particular consisting of an encapsulation material or a protective lacquer.

FIG. 3 shows a schematic illustration of an extension of the conductor trace 104. The conductor trace 104 in the coupling portion forms at least two electrical contacts 301, 302, wherein the trace-shaped extension of the conductor trace 104 extends from one of the electrical contacts 301 over the attachment portion up to the other electrical contact 302. Thus, the conductor trace 104 extends in a loop-shape from one end of the attachment portion 102, to which the coupling portion 103 is coupled and the first electrical contact 301 is arranged, to an opposing end of the attachment portion 102 and again back to the second electrical contact 302. Thus, a voltage source and control circuit 901 (see FIG. 9), respectively, may centrally supply the required electric energy for the resistance measurement from the coupling portion 103.

FIG. 4 shows a schematic illustration of a meander-shaped extension of the conductor trace 104 between the contacts 301, 302 according to an exemplary embodiment of the present invention. Thus, a large part of the surface of the attachment portion 102 may be covered with the conductor trace 104, so that the probability for the measurement of local deformations is increased.

In particular stretching sensors which are printed on basis of conductive ink (conductor traces 104) may be correspondingly applied both in a line-type manner (see FIG. 3) and in a meander-type manner (see FIG. 4). In particular, the width of the trace-shaped extension of a conductor trace 104 may be between 20 μm (micrometer) and 2500 μm, in particular between 25 μm and 2000 μm.

FIG. 5 shows a schematic illustration of a conductor trace 104 in a substrate 501 according to an exemplary embodiment of the present invention. Applying a conductor trace 104 along the trace-shaped extension may be performed by gluing the substrate 501 on the attachment portion 102.

FIG. 6 shows a schematic illustration of a conductor trace 104 with a constriction and tapering 601, respectively. At least two trace portions of the trace-shaped extension of the conductor trace 104 comprise different trace widths b1, b2 with respect to each other. In particular, the conductor trace may comprise one or a plurality of constrictions and taperings 601, respectively, at certain positions of the attachment portion 103. When the position of the constriction 601 is known, the position of the deformation in case of a certain change in resistance may be exactly determined. By the position of the constrictions, the preferred direction of the tapered resistance traces of the conductor trace and therefore the directional dependency of the sensitivity may be determined.

FIG. 7 shows a schematic illustration of a coupling portion 103 with an interface element 701. The interface element 701 is configured for coupling an energy source and/or for an evaluation unit 105. In particular, the interface element comprises a USB-port, an induction loop, or an RFID interface. Therefore, energy for the conductor trace 104 may be inductively introduced from outside into the coupling portion 103, for example. Furthermore, the measured signals concerning the resistance of the conductor trace may be transmitted via the interface element (e.g. comprising an RFID-module).

FIG. 8 shows a schematic sectional view of an attachment portion 102 with a groove 802. In the groove 802, the conductor trace 104 is arranged. The conductor trace may be attached to sidewalls of the groove 802 or to the bottom surface of the groove 802. Thus, the conductor trace 104 may be protected against outer influences.

Between the surface of the attachment portion 102 and the conductor trace 104, an electrically isolating isolating layer 801 is arranged. The layer thickness of the isolating layer 801 may be between 1 μm (micrometer) to 10000 μm, in particular 15 μm to 5000 μm, for example.

Furthermore, the groove 802 is filled with a sealing material 803, wherein the sealing material 803 in particular comprises silicone, polyurethane and/or acrylic resin. Thus, the protection of the conductor trace against outer influences is increased.

FIG. 9 shows a schematic sectional view of a coupling portion 103 with a groove 802. In the coupling portion 103, a control circuit 901 for controlling a current in the conductor trace 104 is arranged. The control circuit 104 may also be a part of the evaluation unit 105. In particular, the control circuit 901 controls the electric energy supply in the conductor trace 104. The control circuit 104 is integrated in the coupling portion 103. The control circuit 901 may comprise electronic components, such as relays or processors, for example. In particular, the control circuit 901 may be printed on the surface in the groove 802. The control circuit further comprises a radio module 902 for transmitting signals concerning the resistance of the conductor trace 104 to an evaluation unit 105 which is spaced apart. In particular, the radio module 902 is configured to transmit the signals to an evaluation unit 105 in a wireless manner. In particular, the radio module 902 may form a Bluetooth module, an induction module or an RFID module, to transmit the signals. Furthermore, also in the coupling portion 103, an energy source 903, such as a battery, may be provided.

FIG. 10 shows a schematic sectional view of a coupling portion 103 with a groove 802 in which an evaluation unit 105 is arranged. The evaluation unit 105 is configured to measure changes in resistance of the conductor trace. In the embodiment in FIG. 10, the evaluation unit 105 is integrated in the coupling portion 103. The evaluation unit 105 receives the signals of the corresponding resistances of the conductor trace 104 and determines if the deviation of the electrical resistance in the conductor trace 104 is within the boundary values or exceeds a certain boundary value. The evaluation unit 105 may subsequently forward the evaluated data concerning the change in resistance of the conductor trace 104 to a monitoring device.

The evaluation unit 105 e.g. comprises a signal element 1001, wherein the signal element 1001 is configured to output an indication signal, in particular a visual or acoustic indication signal, based on a detected change in resistance. For example, the signal element 1001 may constitute a sound outputting loudspeaker or an optical element, such as an LED, to indicate the condition of the device 100, 1100. For example, if the evaluation unit 105 detects that certain boundary values of the change in resistance of the conductor trace 104 are exceeded, an alert signal as indication signal may be acoustically output. Furthermore, for example when a change in resistance of the conductor trace 104 is present within the boundary values, an LED may light up in green. When a boundary value of the change in resistance is exceeded, the color of light is adapted, for example by an LED outputting a yellow or a red light.

Furthermore, at the attachment body 101, in particular in the coupling portion 102, an energy source 903, in particular a battery, is provided, for supplying electric energy to the conductor trace, the control circuit 901, and the evaluation unit 105, if the evaluation unit 105 is integrated in the attachment body 101.

FIG. 11 shows a schematic illustration of a device as a screw element and bolt element 1100, respectively.

The screw element 1100 is attached in the support element 160 by a press fit, for example. The screw element 1100 comprises a screw head 1102 and a shaft 1103. The shaft 1103 forms the attachment portion 102 and the screw head 1102 forms the coupling portion 103. The conductor trace 104 extends at least along the shaft 1103. Via a conductive connection, in the coupling portion 103, the corresponding contacts 301, 302 are formed. The supply of electric energy in the conductor trace 104 is controlled by the control circuit 901. By a radio module 902, corresponding control signals may be wirelessly transmitted to the control circuit 901. Furthermore, the signals concerning the resistance measurement are transmitted from the radio module 902 to an, e.g. external, evaluation unit 105.

Furthermore, the screw head 1102 may comprise a tool reception 1101 in which a corresponding tool, such as a screw driver, may engage. At the same time, electric energy may be coupled, for example via the tool reception 1101, to supply the control circuit 901 with electric energy. Furthermore, a thread 1104 may be provided at the screw element 1100 on the surface of the attachment portion 102. Along the longitudinal extension of the screw element 1100, through the thread turns (German: Gewindegänge) of the thread 1104, a narrow groove may be milled in which the conductor trace 104 is provided.

FIG. 12 shows a schematic illustration of a device as reinforcing rod 1200 according to an exemplary embodiment of the present invention. The attachment portion 102 of the reinforcing rod 1200 stabilizes the support element, for example a concrete element 1201. The reinforcing rod 1200 forms a metal rod which is casted by concrete material 1201. In this way, reinforced concrete is manufactured which is preferably used in buildings. During the lifetime of the building, the electrical resistances of the inventive reinforcing rods 1200 may be read, so that the construction-technical condition of the reinforced concrete may be concluded. Thus, a real-time monitoring of the condition of a building may be realized. The data concerning the electrical resistances of the reinforcing rods 1200 may be read continuously or in certain control periods.

The reinforcing rod 1200 correspondingly comprises an attachment portion which is enclosed by the construction mass and the concrete mass 1201, respectively. The conductor trace is applied on the attachment portion 1204 and/or in a groove 802 and an opening of the attachment portion 102, respectively. For a better protection, the coupling portion 103 may also be formed in the interior of the attachment body 101 of the reinforcing rod 1200. In particular, the interface element comprises an induction loop and/or an RFID interface in the coupling portion 103, to inductively introduce energy for the conductor trace 104 from outside into the coupling portion 103.

Supplementary it is noted that "encompassing" does not exclude other elements or steps and "a" or "an" does not exclude a plurality. Furthermore, it is noted that features or steps which are described with reference to one of the above embodiments may also be used in combination with other features or steps of other above described embodiments. Reference signs in the claims are not to be construed as limitation.

LIST OF REFERENCE SIGNS 100 device, rock anchor device
101 attachment body
102 attachment portion
103 coupling portion
104 conductor traces
105 evaluation unit
106 attachment plate
150 object
151 mortar
160 support element
301 first contact
302 second contact
501 substrate
601 constriction
701 interface element 801 isolating layer
802 groove
803 sealing material
901 control circuit
902 radio module
903 energy source
1001 signal element
1100 device, screw element
1101 tool reception
1102 screw head
1103 shaft
1200 device, reinforcing rod
1201 mold compound, concrete
1202 building wall

The invention claimed is:

1. Device for attaching an object to a support element and/or for stabilizing the support element, wherein the device comprises a condition monitoring for determining a deformation, the device comprising
an attachment body with an attachment portion for inserting in the support element,
a conductor trace which is electrically conductive and applied along a trace-shaped extension for measuring a mechanical tension at the attachment portion,
wherein the attachment body comprises a coupling portion for coupling with an evaluation unit,
wherein the conductor trace is configured such that it is suppliable with electric energy from the coupling portion,
wherein the electrical resistance of the conductor trace is indicative for the deformation of the attachment body in the attachment portion.

2. Device according to claim 1,
wherein the conductor trace comprises a carrier material in which conductive particles are embedded.

3. Device according to claim 1,
wherein the trace-shaped extension of the conductor trace protrudes in the coupling portion such that an electrical conductivity is present between the conductor trace in the coupling portion and the attachment portion;
in particular wherein the conductor trace establishes at least two electrical contacts in the coupling portion,
wherein the trace-shaped extension of the conductor trace extends from one of the electrical contacts via the attachment portion to the other electrical contact.

4. Device according to claim 1, comprising at least one of the following features:
wherein the trace-shaped extension of the conductor trace in the attachment portion is at least partially meander-shaped;
wherein the width of the trace-shaped extension is in particular between 20 µm and 2500 µm, in particular between 25 µm and 2000 µm;
wherein at least two trace portions of the trace-shaped extension comprise different trace widths with respect to each other.

5. Device according to claim 1,
wherein between the surface of the attachment portion and the conductor trace an electrically isolating isolating layer is arranged,
wherein the isolating layer in particular comprises a polymer substrate, in particular a thermoplast film and/or elastomer film.

6. Device according to claim 1,
wherein the conductor trace is configured elastically and the conductor trace is applied to the attachment portion in a stretched and biased state.

7. Device according to claim 1,
wherein the attachment portion comprises a groove in which the conductor trace is arranged.

8. Device according to claim 7,
wherein the groove is filled with a sealing material,
wherein the sealing material in particular comprises silicone, polyurethane and/or acrylic resin.

9. Device according to claim 1,
wherein a control circuit for controlling a current in the conductor trace is arranged in the coupling portion.

10. Device according to claim 9, comprising at least one of the following features:
wherein the control circuit in the coupling portion is printed on the surface of the coupling portion;
wherein the control circuit comprises a radio module for transmitting signals concerning the resistance of the conductor trace to an evaluation unit which is spaced apart;
wherein the attachment body in the coupling portion comprises an interface element for an energy source and/or for an evaluation unit,
wherein the interface element in particular comprises a USB-port, an induction loop, or an RFID interface.

11. Device according to claim 1,
wherein an evaluation unit which is configured to measure changes in resistance of the conductor trace is arranged in the coupling region;
in particular wherein the evaluation unit comprises a signal element,
wherein the signal element is configured to output an indication signal, in particular a visual or acoustic indication signal, based on a detected change in resistance.

12. Device according to claim 1, comprising at least one of the following features:
wherein the attachment body comprises an energy source, in particular a battery, for supplying electric energy in the conductor trace;
wherein the attachment body is at least partially encapsulated by a protective layer, in particular consisting of an encapsulating material or a protective lacquer.

13. Device according to claim 1,
wherein the attachment body is configured as a rock anchor, such that the object, in particular a tubbing, is attachable to the support element, in particular a mountain wall or a support wall, by the attachment portion, or
wherein the attachment body is configured as a supporting anchor, such that the attachment portion, for stabilizing the support element, in particular a mountain wall or a support wall, is inserted in the support element.

14. Device according to claim 1, comprising at least one of the following features:
wherein the attachment body is configured as a reinforcing rod, such that the support element, in particular a concrete element, is stabilizable by the attachment portion;
wherein the attachment body is configured as a screwing element, a bolt element, or a dowel, such that the object is attachable to the support element, in particular a building wall, by the attachment portion.

15. Method for determining a deformation of a device according to claim 1 for attaching an object to a support element, wherein the method comprises
  measuring an electrical resistance of the conductor trace, wherein the electrical resistance is indicative for the deformation of the attachment body in the attachment portion.

16. Method for manufacturing a device for attaching an object to a support element and/or for stabilizing the support element, wherein the device comprises
  providing an attachment body with an attachment portion for inserting in the support element,
  applying an electrically conductive conductor trace along a trace-shaped extension for measuring a mechanical tension at the attachment portion,
  wherein the attachment body comprises a coupling portion for coupling with an evaluation unit,
  wherein the conductor trace is configured such that it is suppliable with electric energy from the coupling portion,
  wherein the electrical resistance of the conductor trace is indicative for the deformation of the attachment body in the attachment portion.

17. Method according to claim 16,
  wherein the conductor trace is manufactured from an electrically conductive ink comprising a carrier material which comprises dissolved conductive particles,
  wherein the electrically conductive ink is applied on the attachment portion in a liquid state, and
  wherein the applied carrier material is solidified, so that the arrangement of the conductive particles in the carrier material is fixed.

18. Method according to claim 17,
  wherein the conductive ink is applied on the attachment portion by a screen printing method, a gravure printing method, or by an ink jet printing method.

19. Method according to claim 16,
  wherein the conductor trace is present in a substrate,
  wherein applying a conductor trace along the trace-shaped extension comprises gluing the substrate on the attachment portion.

20. Method according to claim 19,
  wherein the conductor trace is configured elastically,
  wherein the method comprises
    stretching the conductor trace in a biased state prior to applying the conductor trace.

* * * * *